United States Patent
Yabuki

(10) Patent No.: US 8,543,670 B2
(45) Date of Patent: Sep. 24, 2013

(54) TERMINAL DEVICE AND COMPUTER READABLE MEDIUM FOR ACCESSING CONTENT ON A NETWORK

(75) Inventor: Tomoyasu Yabuki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 910 days.

(21) Appl. No.: 12/696,158

(22) Filed: Jan. 29, 2010

(65) Prior Publication Data

US 2010/0191838 A1 Jul. 29, 2010

(30) Foreign Application Priority Data

Jan. 29, 2009 (JP) .................................. 2009-018510

(51) Int. Cl.
*G06F 15/177* (2006.01)
*G06F 15/173* (2006.01)

(52) U.S. Cl.
USPC .......................................... 709/220; 709/225

(58) Field of Classification Search
None
See application file for complete search history.

(56) References Cited

U.S. PATENT DOCUMENTS

| | | | |
|---|---|---|---|
| 2002/0165987 A1* | 11/2002 | Arisaka et al. ................ | 709/246 |
| 2004/0212824 A1 | 10/2004 | Ohara | |
| 2005/0165784 A1* | 7/2005 | Gomez et al. ..................... | 707/9 |
| 2007/0286387 A1* | 12/2007 | Fuse et al. ................ | 379/202.01 |
| 2008/0165209 A1 | 7/2008 | Kondo et al. | |
| 2010/0191838 A1* | 7/2010 | Yabuki ......................... | 709/220 |

FOREIGN PATENT DOCUMENTS

| | | |
|---|---|---|
| JP | 2003-108354 A | 4/2003 |
| JP | 2004-078554 A | 3/2004 |
| JP | 2005-157563 A | 6/2005 |
| JP | 2008-165692 A | 7/2008 |
| JP | 2008-225791 A | 9/2008 |

OTHER PUBLICATIONS

Japan Patent Office; Notification of Reasons for Rejection for patent application No. JP2009-018510, dated Dec. 14, 2010. (counterpart to above-captioned U.S. patent application).
All About, an RSS list, dated Sep. 15, 2009, Internet URL: http://allabout.co.jp/rss/.

* cited by examiner

*Primary Examiner* — Umar Cheema
(74) *Attorney, Agent, or Firm* — Baker Botts L.L.P.

(57) ABSTRACT

A terminal device includes an access unit accessing content summary information on a server based on location information, the content summary information containing first information and second information, the first information providing association between an identification for identifying a status of the terminal device and second location information for accessing the second information, the second information providing summary information of contents regarding the status of the terminal device, an identification acquiring unit acquiring the identification, a first location storage unit storing first location information for accessing the first information, a first access controller controlling the access unit to access the first information based on the first location information stored, a retriever retrieving the second location information associated with the acquired identification based on the first information accessed, and a second access controller controlling the access unit to access the second information based on the second location information retrieved.

18 Claims, 9 Drawing Sheets

ERROR GROUP INFORMATION TABLE

| ERROR GROUP | MAJOR DIVISIONAL ERROR |
|---|---|
| a | UNKNOWN ERROR |
| b | PAPER JAM ERROR |
| c | COVER OPEN ERROR |
| d | INK-RELATED ERROR |
| ... | ... |

FIG. 2

ERROR CODE INFORMATION TABLE

| ERROR CODE | MINOR DIVISIONAL ERROR |
|---|---|
| 0001 | HANDLING-UNKNOWN ERROR |
| 0002 | PAPER JAM ERROR |
| 0003 | EJECTION JAM ERROR |
| 0004 | CARTRIDGE COVER OPEN ERROR |
| 0005 | SCANNER COVER OPEN ERROR |
| 0006 | INK EMPTY ERROR |
| 0007 | INK-BLOCKED ERROR |
| ... | ... |

FIG. 3

SETTING INFORMATION TABLE

44

| SETTING ITEM | REGISTERED DATA |
|---|---|
| REGISTERED ERROR GROUP | d |
| REGISTERED ERROR CODE | 0006 |
| BOOKMARK URL | http://rss.brother.com/errorURL/ |
| REGISTERED RSS FEED URL | http://rss.brother.com/InkEmptyERROR/ |

223 — REGISTERED ERROR GROUP
224 — REGISTERED ERROR CODE
201 — BOOKMARK URL
222 — REGISTERED RSS FEED URL

FIG. 4

BOOKMARK TABLE

94

| DATA NUMBER | CONTENT TITLE CHARACTER STRING | RSS FEED URL |
|---|---|---|
| 1 | a 0001<br>UNKNOWN ERROR | http://rss.brother.com/UnknownERROR/ |
| 2 | b 0002<br>PAPER JAM ERROR | http://rss.brother.com/PaperJamERROR |
| 3 | b 0003<br>EJECTION JAM ERROR | 2http://rss.brother.com/PaperJamERROR2 |
| 4 | c 0004<br>CARTRIDGE COVER OPEN ERROR | http://rss.brother.com/CartridgeOpenERROR/ |
| 5 | c 0005<br>SCANNER COVER OPEN ERROR | http://rss.brother.com/ScannerOpenERROR/ |
| 6 | d 0006<br>INK EMPTY ERROR | http://rss.brother.com/InkEmptyERROR/ |
| 7 | d 0007<br>INK-BLOCKED ERROR | http://rss.brother.com/InkBlockedERROR/ |
| ⋮ | ⋮ | ⋮ |
| n | ... | ... |

REGIONAL-CODE INFORMATION TABLE — 46a

| REGIONAL CODE | REGIONAL NAME |
|---|---|
| a | NORTH AND CENTRAL AMERICA |
| b | EUROPE |
| c | RUSSIA |
| ⋮ | ⋮ |
| f | JAPAN |
| ⋮ | ⋮ |

COUNTRY CODE INFORMATION TABLE — 48a

| COUNTRY CODE | COUNTRY NAME |
|---|---|
| 0001 | UNITED STATES |
| 0002 | CANADA |
| 0003 | GERMANY |
| 0004 | UNITED KINGDOM |
| ⋮ | ⋮ |
| 0048 | JAPAN |
| ⋮ | ⋮ |

SETTING INFORMATION TABLE — 44a

| SETTING ITEM | REGISTERED DATA |
|---|---|
| REGISTERED REGIONAL CODE | a |
| REGISTERED COUNTRY CODE | 0001 |
| BOOKMARK URL | http://rss.brother.com/countryURL/ |
| REGISTERED RSS FEED URL | http://rss.brother.com |

223a, 224a, 201a, 222a

BOOKMARK TABLE 94a

| DATA NUMBER | CONTENT TITLE CHARACTER STRING | RSS FEED URL |
|---|---|---|
| 1 | a 0001 United States | http://rss.brother.com |
| 2 | a 0002 Canada | http://rss.brother.co.ca |
| 3 | b 0003 Germany | http://rss.brother.co.de |
| 4 | b 0004 United Kingdom | http://rss.brother.co.uk |
| ⋮ | ⋮ | ⋮ |
| 48 | f 0048 Japan | http://rss.brother.co.jk |
| ⋮ | ⋮ | ⋮ |
| k | ... | ... |

TERMINAL DEVICE AND COMPUTER READABLE MEDIUM FOR ACCESSING CONTENT ON A NETWORK

CROSS-REFERENCE TO RELATED APPLICATION

This application claims priority under 35 U.S.C. §119 from Japanese Patent Application No. 2009-018510 filed on Jan. 29, 2009. The entire subject matter of the application is incorporated herein by reference.

BACKGROUND

1. Technical Field

The following description relates to one or more techniques for accessing contents open to the public on a network.

2. Related Art

There are various kinds of contents open to the public on a network. Further, there are servers on the network which open to the public content summary information that includes a URL and a title of each of the contents. A feed is cited as an example of the content summary information. A format such as RSS (Resource Description Framework Site Summary) and Atom is generally applied to the feed.

A terminal device has been known which is configured to acquire RSS feeds (each of which contains an image of an article as well) from a plurality of RSS servers and display a list of titles of the articles. When a title of an article is selected from the list, the terminal device displays thereon the title, a description, and an image of the article, and a link (button) to a web page of the article. Then, when the link button is selected, the terminal device acquires and displays information contained on the web page.

SUMMARY

Such a terminal device may be required to select and access a corresponding one of plural kinds of feeds, depending on a status of the terminal device.

Aspects of the present invention are advantageous to provide one or more improved techniques that make it possible to select an intended one of plural kinds of feeds in an easy manner.

According to aspects of the present invention, a terminal device is provided, which includes an access unit configured to access content summary information on a server based on location information, the content summary information comprising first information and second information, the first information providing association between an identification for identifying a status of the terminal device and second location information for accessing the second information, the second information providing summary information of contents regarding the status of the terminal device, an identification acquiring unit configured to acquire the identification, a first location storage unit configured to store first location information for accessing the first information, a first access controller configured to control the access unit to access the first information based on the first location information stored on the first location storage unit, a retriever configured to retrieve the second location information associated with the acquired identification based on the first information accessed, and a second access controller configured to control the access unit to access the second information based on the second location information retrieved by the retriever.

Optionally, the identification acquiring unit may be configured to acquire the identification input externally. Alternatively, the identification acquiring unit may be configured to acquire the identification automatically in response to detection of the status of the terminal device.

According to aspects of the present invention, further provided is a computer readable medium having computer readable instructions stored thereon, which are executable by a processor accessible to content summary information on a server based on location information. The content summary information comprises first information and second information, the first information providing association between an identification for identifying a status of the processor and second location information for accessing the second information, the second information providing summary information of contents regarding the status of the processor. The instructions cause the processor to perform an identification acquiring step of acquiring the identification, a first location storing step of storing first location information for accessing the first information, a first accessing step of accessing the first information based on the first location information stored in the first location storing step, a retrieving step of retrieving the second location information associated with the acquired identification based on the first information accessed, and a second accessing step of accessing the second information based on the second location information retrieved in the retrieving step.

BRIEF DESCRIPTION OF THE ACCOMPANYING DRAWINGS

FIG. 1 schematically shows a multi-function peripheral (MFP) system in a first embodiment according to one or more aspects of the present invention.

FIG. 2 exemplifies an error group information table in the first embodiment according to one or more aspects of the present invention.

FIG. 3 exemplifies an error code information table in the first embodiment according to one or more aspects of the present invention.

FIG. 4 exemplifies a setting information table in the first embodiment according to one or more aspects of the present invention.

FIG. 5 exemplifies a bookmark table in the first embodiment according to one or more aspects of the present invention.

FIG. 8 exemplifies a regional-code information table in the first embodiment according to one or more aspects of the present invention.

FIG. 9 exemplifies a country code information table in the first embodiment according to one or more aspects of the present invention.

FIG. 10 exemplifies a setting information table in a second embodiment according to one or more aspects of the present invention.

Figures 11, 12:
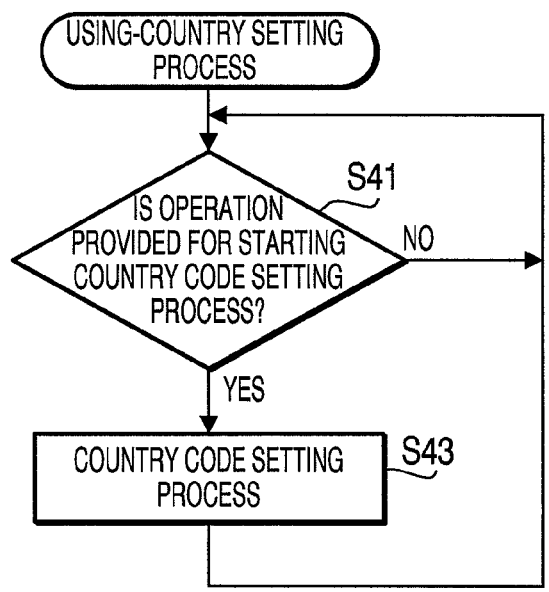

FIG. 11 exemplifies a bookmark table in the second embodiment according to one or more aspects of the present invention.

FIG. 12 is a flowchart showing a procedure of a using-country setting process to be executed by the MFP in the second embodiment according to one or more aspects of the present invention.

Figure 13:
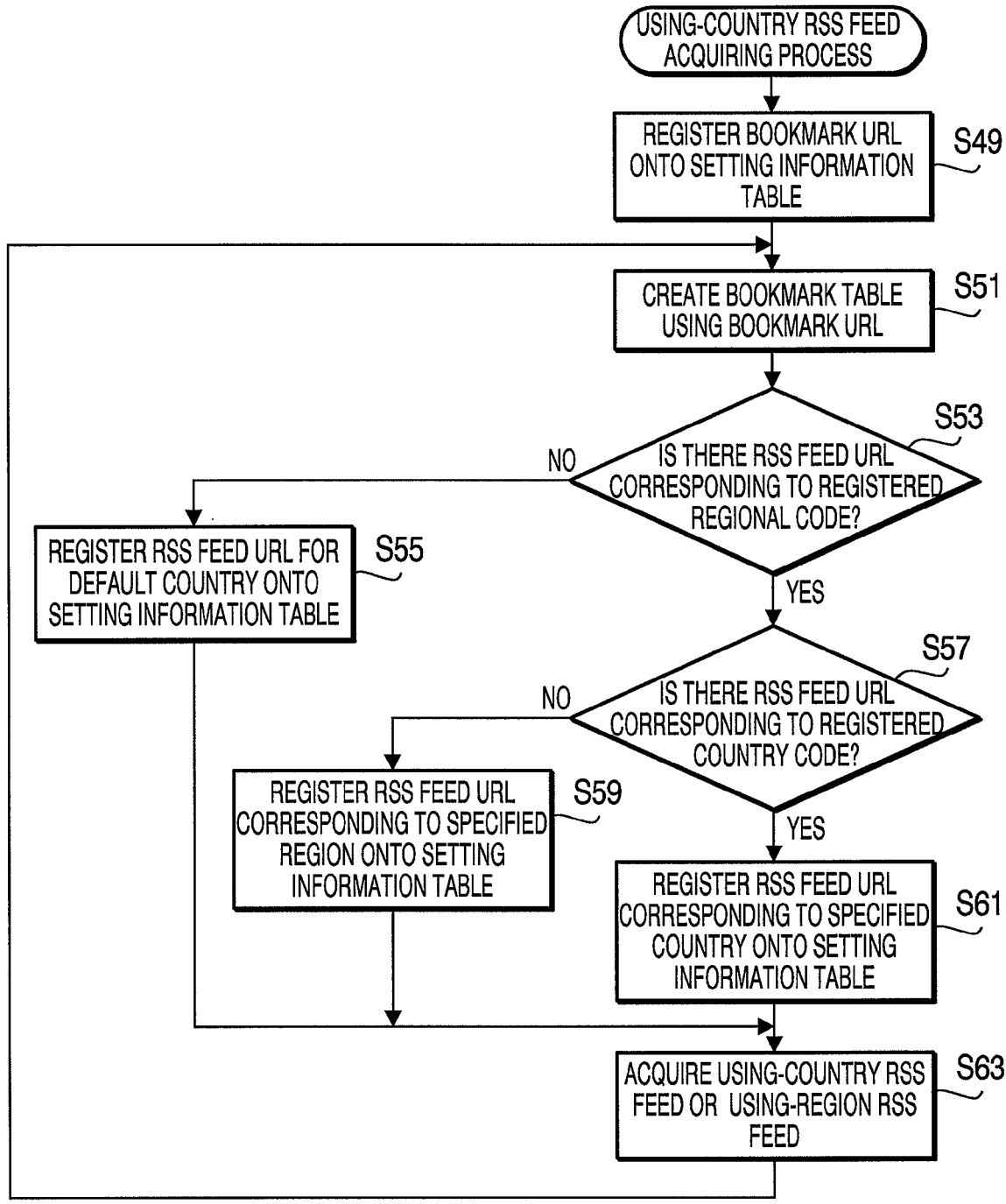

FIG. 13 is a flowchart showing a procedure of a using-country RSS feed acquiring process to be executed by the MFP in the second embodiment according to one or more aspects of the present invention.

Figure 14:
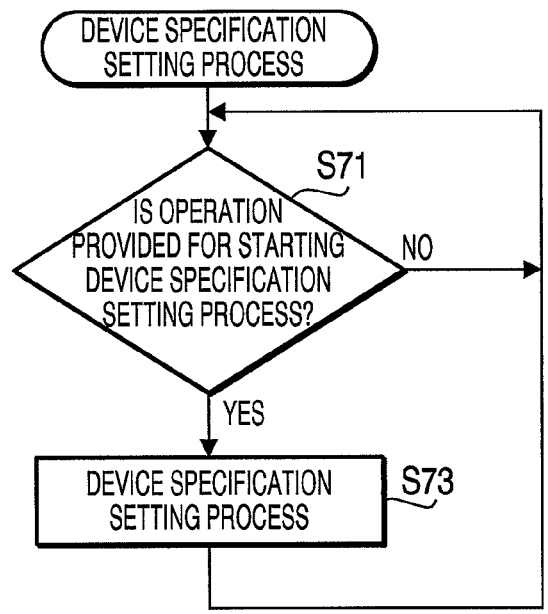

FIG. 14 is a flowchart showing a procedure of a device specification setting process to be executed by the MFP in a third embodiment according to one or more aspects of the present invention.

Figure 15:
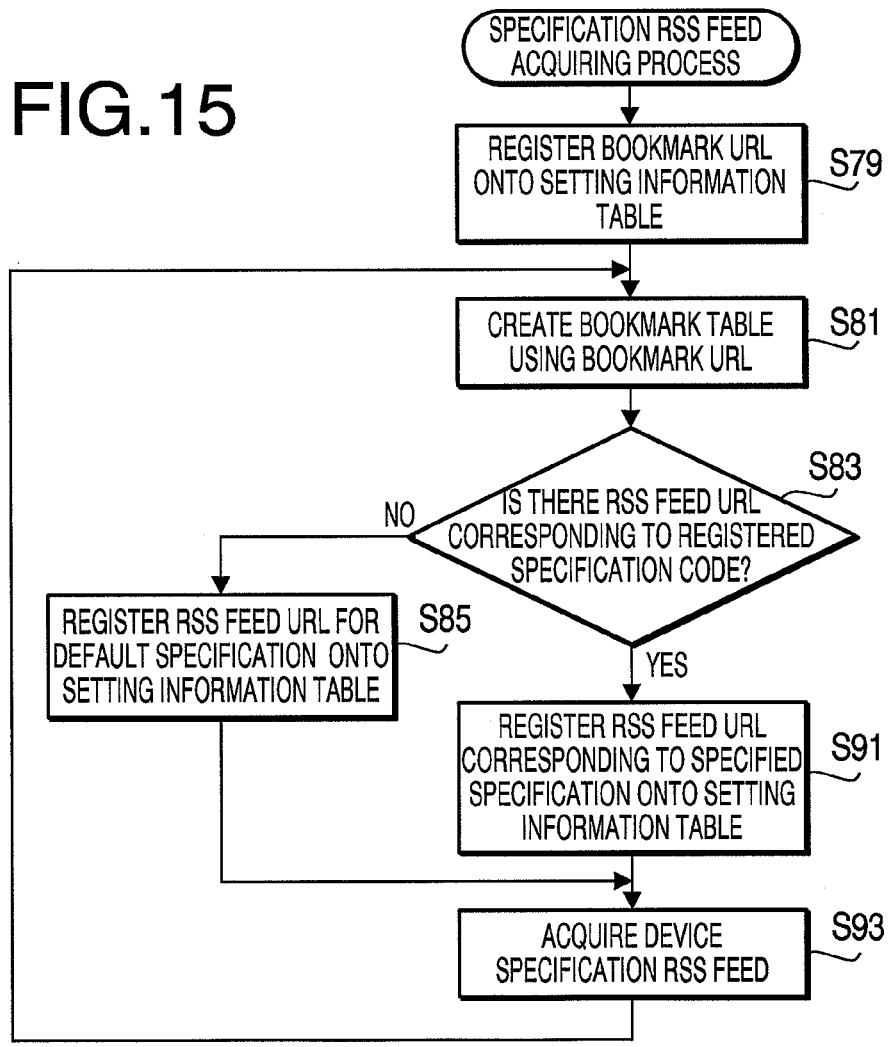

FIG. 15 is a flowchart showing a procedure of a specification RSS feed acquiring process to be executed by the MFP in the third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

First Embodiment

Figure 1:
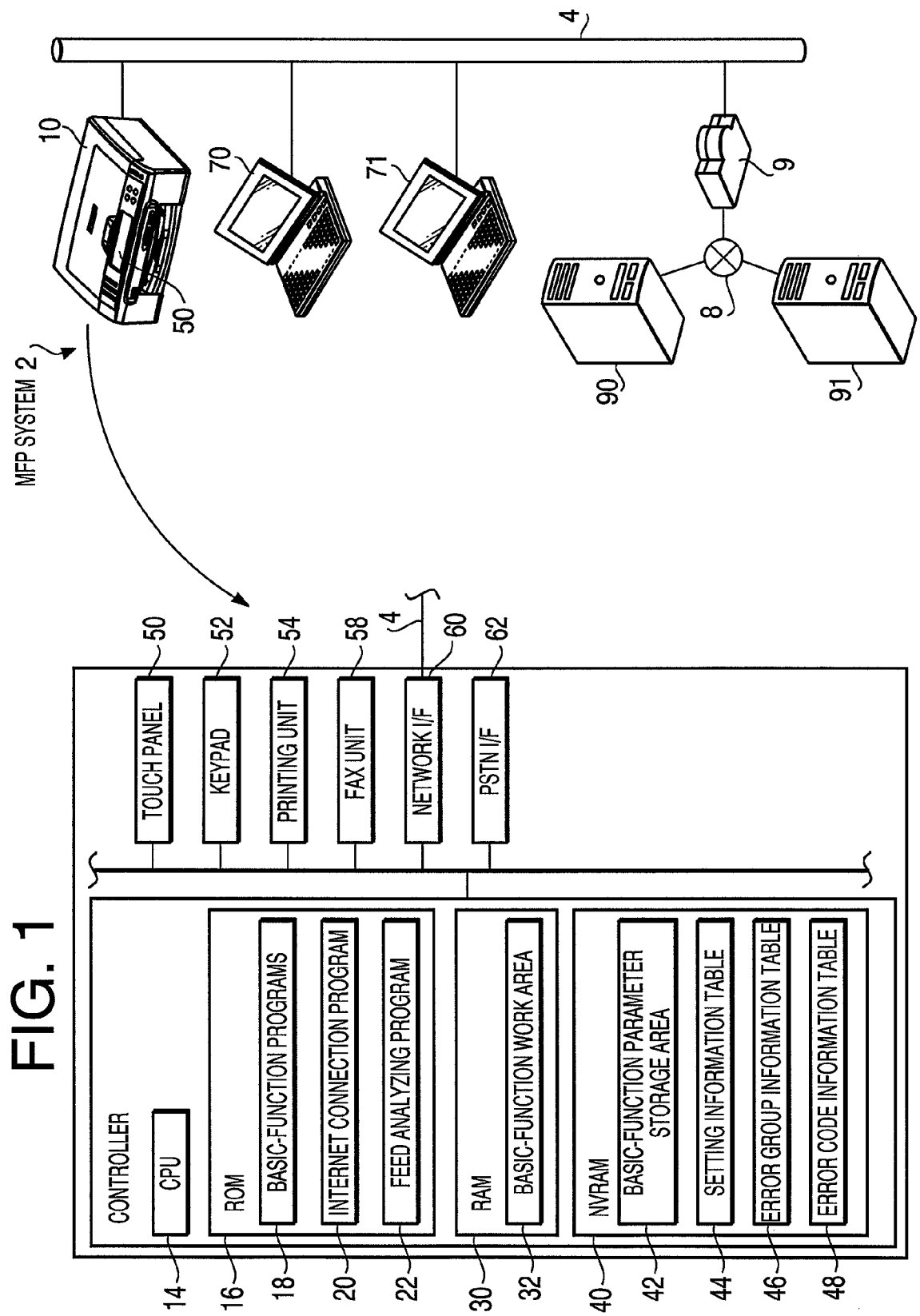

In a first embodiment, an RSS feed URL 202, depending on the kind of an error caused in a multi-function peripheral (MFP) 10, is acquired from a bookmark server 90. As illustrated in FIG. 1, an MFP system 2 includes the MFP 10, a plurality of PCs 70 and 71, the bookmark server 90, and a plurality of content providing servers 91.

The MFP 10 includes a controller 12, a touch panel 50, a keypad 52, a printing unit 54, a facsimile unit 58, a network interface (I/F) 60, and a PSTN I/F 62. In addition, the controller 12 has a CPU 14, a ROM 16, a RAM 30, and an NVRAM 40.

The CPU 14 performs various processes in accordance with various programs stored on the ROM 16. Basic-function programs 18 are adapted to control basic operations of the MFP 10. The basic-function programs 18 include programs for controlling the printing unit 54 and the facsimile unit 58. An Internet connection program 20 is for establishing a connection with an Internet 8. A feed analyzing program 22 is for analyzing a feed acquired from a content providing server 91 and creating content information.

The NVRAM 40 is provided with a basic-function parameter storage area 42, a setting information table 44, an error group information table 46, and an error code information table 48. The basic-function parameter storage area 42 is configured to store various parameters, such as print settings and facsimile settings, which the CPU 14 uses when executing processes in accordance with the basic-function programs 18.

The error group information table 46 is configured to store error groups 203 and major divisional errors in association with each other. Various kinds of errors caused in the MFP 10 are classified into the major divisional errors on the basis of a higher concept. As exemplified in FIG. 2, each of the error groups 203 is denoted by a letter of the alphabet (e.g., "a," "b," "c," "d," etc.). The major divisional errors include "unknown error" representing unspecified errors, "paper jam error" representing paper jam, "cover open error" representing any cover left opened, and "ink-related error" representing errors concerning ink.

The error code information table 48 is configured to store error codes 204 and minor divisional errors in association with each other. The errors classified into each of the major divisional errors are further classified into the minor divisional errors, based on detailed information on what kind of error each error is. As exemplified in FIG. 3, the error codes 204 are denoted by numerals (e.g., "0001," "0002," "0003," "0004," etc.). Additionally, for instance, the errors classified into the major divisional error "ink error" are further classified into minor divisional errors such as "ink empty error" representing a state out of ink and "ink blocked error" representing a clogged state of an ink channel.

The setting information table 44 is configured to store various settings. As exemplified in FIG. 4, the setting information table 44 stores setting items such as a registered error group 223, a registered error code 224, a bookmark URL 201, and a registered RSS feed URL 222. As the registered error group 223, an error group 203 corresponding to an error caused in the MFP 10 is registered. When no error occurs, no error group is registered as the registered error group 223. As the registered error code 224, an error code 204 corresponding to the error caused in the MFP 10 is registered. When no error occurs, no error code is registered as the registered error code 224. In addition, when a major divisional error has been specified, yet a minor divisional error has not been specified for the error caused in the MFP 10, no error code is registered as the registered error code 224. The bookmark URL 201 is information for accessing the bookmark server 90 and acquiring bookmark RSS feeds. For example, the bookmark URL 201 may previously be registered as an initial setting at the time of manufacture of the MFP 1. As the registered RSS feed URL 222, stored is an RSS feed URL 202 corresponding to the registered error group 223 and the registered error code 224, which URL 202 is retrieved from the bookmark table 94.

The network I/F 60 is linked with a LAN cable 4. The MFP 10 is communicable with the PCs 70 and 71, and accessible to the Internet 8.

The RAM 30 is provided with a basic-function work area 32, which is a storage area to store various kinds of data generated during execution of a process in accordance with the basic-function programs 18.

The MFP 10 is connected with the LAN cable 4. The PCs 70 and 71 are connected with the LAN cable 4. The LAN cable 4 is linked with the Internet 8 via a router 6. The bookmark server 90 and the content providing servers 91 are connected with the Internet 8. Each of the bookmark server 90 and the content providing servers 91 opens to the public a site including a plurality of contents.

Each of the content providing servers 91 stores error information RSS feeds (RSS-format feeds). Each of the error information RSS feeds is created for a corresponding one of errors, and includes various kinds of information such as information on how to handle or settle the corresponding error. For instance, an error information RSS feed, corresponding to the ink empty error, contains information on how to replace an ink cartridge and how to purchase a new ink cartridge.

The bookmark server 90 stores the bookmark RSS feeds that are transmitted to the MFP 10 via the Internet 8. The MFP 10 creates the bookmark table 94 based on the bookmark RSS feeds. On the bookmark table 94, a content title character string 140 and an RSS feed URL 202 are registered for each of plural kinds of errors. The content title character string 140 is a character string that includes an error group 203, an error code 204, and title characters representing a title of each content (error). Further, the RSS feed URL 202 is a URL for accessing an RSS feed corresponding to each error.

As exemplified in FIG. 5, the bookmark table 94 is provided with n-pieces storage areas. Data numbers 210 of "1" to "n" are assigned to the storage areas, respectively. For example, the content title character string 140 corresponding to the data number 210 of "6" includes "d" as an error group 203, "0006" as an error code 204, and "ink empty error" as title characters. Further, the RSS feed URL 202 "http://rss.brother.com/InkEmptyERROR/" corresponding to the data number 210 of "6" is a URL for acquiring an error information RSS feed concerning the ink empty error.

Figure 6:
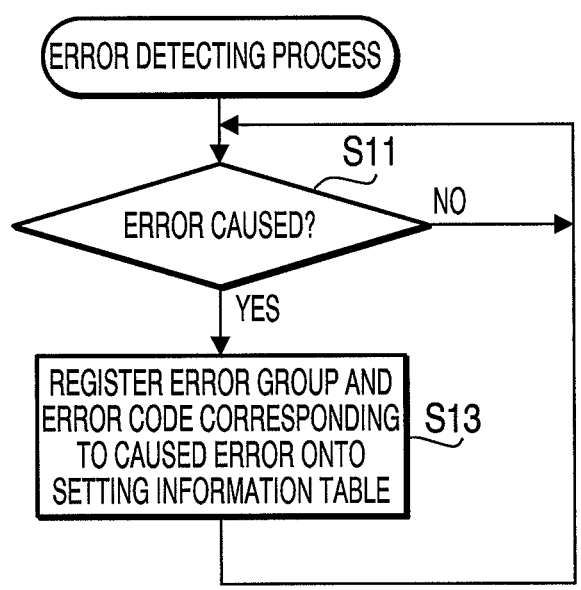
FIG. 6 is a flowchart showing a procedure of an error detecting process to be executed by the MFP in the first embodiment according to one or more aspects of the present invention.
Figure 7:
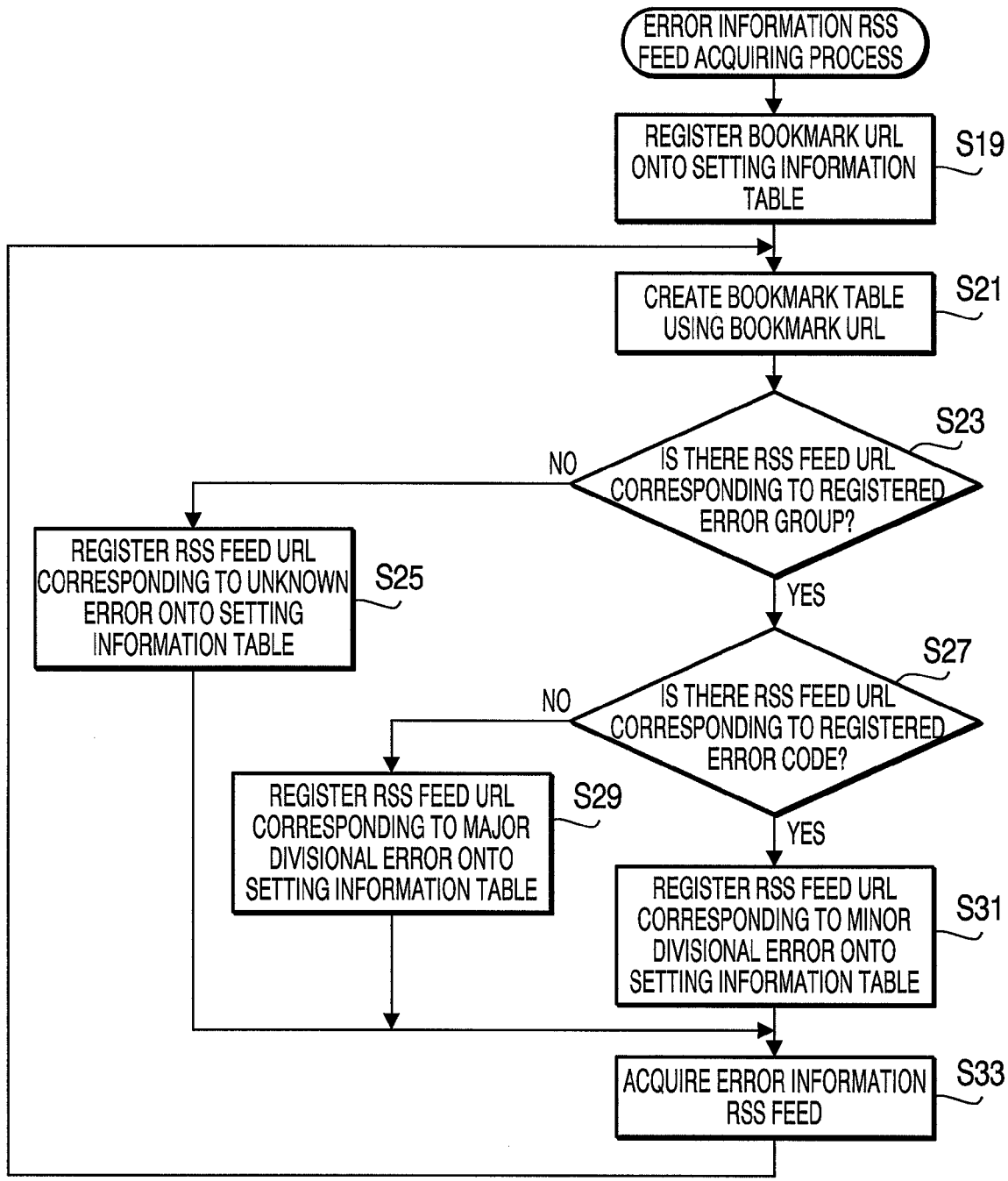
FIG. 7 is a flowchart showing a procedure of an error information RSS feed acquiring process in the first embodiment according to one or more aspects of the present invention.

Operations of the MFP 10 in the first embodiment will be described with reference to FIGS. 6 and 7, under an assumption that an ink empty error has occurred in the MFP 10. An error detecting process will be set forth referring to FIG. 6.

The CPU 14 initially detects (determines) whether an error has been caused in the MFP 10 (S11). When no error has been caused (S11: No), the CPU 14 goes back to S11 to continue the error detection. Meanwhile, when an error has been caused (S11: Yes), the CPU 14 advances to S13.

In 13, the CPU 14 retrieves an error group corresponding to the caused error from the error group information table 46 (S13). Then, the retrieved error group 203 is registered as the registered error group 223 on the setting information table 44. Additionally, the CPU 14 retrieves an error code 204 corresponding to the caused error from the error code information table 48. Then, the retrieved error code 204 is registered as the registered error code 224 on the setting information table 44.

Since the present explanation is being provided under the assumption that the ink empty error has occurred, the error group 203 of "d" is retrieved from the error group information table 46 (see FIG. 2), and registered as the registered error group 223 on the setting information table 44 (see FIG. 4). Further, the error code 204 of "0006" is retrieved from the error code information table 48 (see FIG. 3), and registered as the registered error code 224 on the setting information table 44.

Subsequently, an error information RSS feed acquiring process will be explained with reference to FIG. 7. The bookmark URL 201 is registered onto the setting information table 44 (S19). For example, the bookmark URL 201 may be registered as an initial setting at the time of manufacture of the MFP 10. Further, the bookmark URL 201 may be registered using the MFP 10 or the PC 70 or 71.

A process of S21 to S33 is a loop process executed while the MFP 10 is working. Thereby, an operation of always monitoring an error of the MFP 10 is performed. The CPU 14 accesses the bookmark server 90 based on the bookmark URL 201, and acquires the bookmark RSS feeds (S21). The CPU 14 executes the feed analyzing program 22 to create the bookmark table 94 (see FIG. 5) from the bookmark RSS feeds acquired.

Subsequently, the CPU 14 determines whether there is an RSS feed URL 202 corresponding to the registered error group 223 on the bookmark table 94 (S23). Specifically, the CPU 14 determines whether the content title character strings 140 on the bookmark table 94 include an error group identical to the registered error group 223 on the setting information table 44. When determining that the content title character strings 140 on the bookmark table 94 does not include an error group identical to the registered error group 223 on the setting information table 44 (S23: No), the CPU 14 goes to S25. In S25, the CPU 14 determines that the error caused in the MFP 10 is an unknown error (S25). Then, the CPU 14 registers an RSS feed URL 202 for accessing an error information RSS feed regarding how to settle or handle the unknown error, as the registered RSS feed URL 222 on the setting information table 44. Thereafter, the CPU 14 goes to S33. It is noted that the RSS feed URL 202 corresponding to the unknown error may, for instance, previously be registered as an initial setting at the time of manufacture of the MFP 10. Meanwhile, when determining that the content title character strings 140 on the bookmark table 94 includes an error group identical to the registered error group 223 on the setting information table 44 (S23: Yes), the CPU 14 goes to S27.

In the first embodiment, the CPU 14 detects an error group identical to the registered error group 223 "d" on the setting information table 44 (see FIG. 4) which error group is included in the respective content title character strings 140 corresponding to the data numbers 210 equal to "6" and "7" on the bookmark table 94 (see FIG. 5). Then, the CPU 14 goes to S27.

In S27, the CPU 14 determines whether there is an RSS feed URL 202 corresponding to the registered error code 224 on the bookmark table 94 (S27). Specifically, the CPU 14 determines whether the content title character strings 140 on the bookmark table 94 include an error code identical to the registered error code 224 on the setting information table 44. When determining that the content title character strings 140 on the bookmark table 94 do not include an error code identical to the registered error code 224 on the setting information table 44 (S27: No), the CPU 14 goes to S29. In S29, the CPU 14 determines that the CPU 14 has specified the major divisional error of the caused error based on the error group but not yet the minor divisional error thereof based on the error code. Then, the CPU 14 registers an RSS feed URL 202 for accessing an error information RSS feed regarding how to handle or settle the major divisional error specified, as the registered RSS feed URL 222 on the setting information table 44. Thereafter, the CPU 14 goes to S33. Meanwhile, when determining that the content title character strings 140 on the bookmark table 94 include an error code identical to the registered error code 224 on the setting information table 44 (S27: Yes), the CPU 14 goes to S31.

In the first embodiment, the CPU 14 detects an error code identical to the registered error code 224 "0006" on the setting information table 44 (see FIG. 4) which error code is included in the respective content title character strings 140 corresponding to the data number 210 equal to "6" on the bookmark table 94 (see FIG. 5). Then, the CPU 14 goes to S31.

In S31, the CPU 14 determines that the CPU 14 has exactly specified the caused error based on the major divisional error and the minor divisional error. Then, the CPU 14 registers an RSS feed URL 202 for accessing an error information RSS feed regarding how to handle or settle the minor divisional error, as the registered RSS feed URL 222 on the setting information table 44 (S31). After that, the CPU 14 goes to S33.

In the first embodiment, the RSS feed URL 202 "http://rss.brother.com/InkEmptyERROR/," which corresponds to the data number 210 of "6" on the bookmark table 94 (see FIG. 5), is stored as the registered RSS feed URL 222 on the setting information table 44 (see FIG. 4).

In S33, the CPU 14 accesses a content providing server 91 based on the registered RSS feed URL 222 stored on the setting information table 44, and acquires an intended error information RSS feed from the content providing server 91 (S33). The CPU 14 executes the feed analyzing program 22, creates content information based on the error RSS feed acquired, and displays the created content information on the touch panel 50.

In the first embodiment, the CPU 14 accesses a content providing server 91 based on the registered RSS feed URL 222 "http://rss.brother.com/InkEmptyERROR/," and acquires the error information RSS feed concerning the ink empty error. Then, the CPU 14 creates contents regarding the ink empty error (e.g., an ink cartridge replacement method and an ink cartridge purchasing method), and displays the created contents on the touch panel 50. Thereby, it is possible to render the MFP 10 more user-friendly which helps a user to replace the ink cartridge or purchase an ink cartridge in accordance with the information displayed on the touch panel 50.

Thus, the MFP 10 of the first embodiment can provide the following effects. By storing only the bookmark URL 201 on the setting information table 44, the MFP 10 can acquire an RSS feed URL 202 corresponding to a specified error group 203 and a specified error code 204. Thereby, even when the MFP 10 is required to select an RSS feed URL 202 corresponding to an error state from the RSS feed URLs 202 that are respectively prepared for error states frequently caused in the MFP 10 (e.g., an ink empty error, a paper jam, a cover-open error, etc.) and access the selected URL 202, the MFP 10 needs not store all kinds of RSS feed URLs 202 on storage thereof. Thus, it is possible to reduce a storage capacity of the MFP 10.

In addition, in order to add or change an RSS feed URL 202, the user has only to modify the bookmark RSS feeds stored on the bookmark server 90, and does not have to modify anything of each individual MFP 10. Thus, it is possible for the user to easily add or change an RSS feed URL 202.

Further, the MFP 10 of the first embodiment is provided with two hierarchies of error information, i.e., the error groups 203 and the error codes 204. The error state is classified into a major divisional error based on the error group 203, and further classified into a minor divisional error based on the error code 204. Hence, it is possible to change a degree as to how detailed error information is to be offered depending on to what extent the error state is specified. Thus, it is possible to present appropriate error information.

The MFP 10 of the first embodiment is configured to access an error information RSS feed for a previously-registered unknown error even when the MFP 10 cannot search an RSS feed URL 202 corresponding to any of a specified error group 203 and a specified error code 204 (i.e., when the MFP 10 determines the caused error is an unknown error). Therefore, it is possible to avoid a situation where the MFP 10 cannot access any error information RSS feed when an unknown error is caused in the MFP 10.

Second Embodiment

In a second embodiment, the MFP 10 acquires an RSS feed URL corresponding to a country where the MFP 10 is used. In the second embodiment, the NVRAM 40 (see FIG. 1) is provided with a setting information table 44a, a regional-code information table 46a, and a country code information table 48a.

The regional-code information table 46a stores regional codes 203a and regional names in association with each other. The regional codes are for classifying countries into higher-conceptional categories such as North and Central America and Europe. As exemplified in FIG. 8, each of the regional codes 203a is denoted by a letter of the alphabet (e.g., "a," "b" "c" "d" etc.).

The country code information table 48a stores country codes 204a and country names in association with each other. The country codes 204a are lower-conceptional categories than the regional codes 203a. As exemplified in FIG. 9, the country codes 204a are denoted by numerals (e.g., "0001," "0002," "0003," "0004," etc.).

The setting information table 44a is a table for storing various settings. As exemplified in FIG. 10, the setting information table 44a stores setting items such as a registered regional code 223a, a registered country code 224a, a bookmark URL 201a, and a registered RSS feed URL 222a. As the registered regional code 223a, stored is a regional code 203a of a country where the MFP 10 is used. As the registered country code 224a, stored is a country code 204a of the country where the MFP 10 is used. At the time of shipment of the MFP 10, an arbitrary regional code 203a and an arbitrary country code 204a may be registered as the registered regional code 223a and the registered country code 224a, respectively. It is noted that the bookmark URL 201a and the registered RSS feed URL 222a are the same as the bookmark URL 201 and the registered RSS feed URL 222, respectively. Therefore, detailed explanations about the bookmark URL 201a and the registered RSS feed URL 222a will be omitted here.

Each of the content providing servers 91 stores country information RSS feeds (RSS-format feeds). Each of the country information RSS feeds is created for a corresponding one of countries, and includes various kinds of information (e.g., update information) created in a language of the corresponding country.

The bookmark server 90 stores bookmark RSS feeds (RSS-format feeds). The MFP 10 creates a bookmark table 94a based on the bookmark RSS feeds. On the bookmark table 94a, a content title character string 140a and an RSS feed URL 202a are registered for each country.

As exemplified in FIG. 11, the bookmark table 94a is provided with k-pieces of storage areas. Data numbers 210a of "1" to "k" are assigned to the storage areas, respectively. For example, the content title character string 140a corresponding to the data number 210a of "48" includes "f" as a regional code 203a, "0048" as a country code 204a, and "Japan" as a country name. Further, the RSS feed URL 202a "http://rss.brother.co.jp" corresponding to the data number 210a of "48" is a URL for acquiring a country information RSS feed concerning Japan.

Operations of the MFP 10 in the second embodiment will be described with reference to FIGS. 12 and 13. The following description will be provided under an assumption that the MFP 10 is used in the United States of America. A using-country setting process will be set forth referring to FIG. 12.

In S41, the CPU 14 determines whether an operation is provided for starting a country code setting process (S41). The country code setting process is adapted to set a using country where the MFP 10 is used. The country code setting process is launched, for example, in response to a user operation on the touch panel 50. When determining that an operation for starting a country code setting process is not provided (S41: No), the CPU 14 goes back to S41 and continuously monitors whether an operation for starting a country code setting process is provided. Meanwhile, when determining that an operation for starting a country code setting process is provided (S41: Yes), the CPU 14 advances to S43.

In the country code setting process of S43, the CPU 14 accepts a user's input to specify a using country. The user's input to specify a country is accepted, for example, through the touch panel 50. The CPU 14 retrieves a regional code 204a corresponding to the input country from the regional-code information table 46a, and registers the retrieved regional code 204a as the registered regional code 223a on the setting information table 44a. Additionally, the CPU 14 retrieves a country code 204a corresponding to the input country from the country code information table 48a, and registers the retrieved country code 204a as the registered country code 224a on the setting information table 44a.

In the second embodiment, it is assumed that "United States" is input as a country name. Therefore, the CPU 14 retrieves the regional code 203a of "a" (for North and Central America) from the regional-code information table 46a (see FIG. 8), and registers the regional code 203a of "a" as the registered regional code 223a on the setting information table 44a (see FIG. 10). In addition, the CPU 14 retrieves the country code 204a of "0001" (for the United States) from the country code information table 48a (see FIG. 9), and registers the country code 204a of "0001" as the registered country code 224a on the setting information table 44a.

Subsequently, a using-country RSS feed acquiring process will be set forth with reference to FIG. 13. In S49, the bookmark URL 201a is registered on the setting information table 44a. The bookmark URL 201a may be registered as an initial setting at the time of manufacture of the MFP 10.

A process of S51 to S63 is a loop process executed while the MFP 10 is working. In S51, the CPU 14 accesses the bookmark server 90 based on the bookmark URL 201a, and acquires the bookmark RSS feeds (S51). The CPU 14 runs the feed analyzing program 22 to create the bookmark table 94a as shown in FIG. 11 from the bookmark RSS feeds acquired.

Then, the CPU 14 proceeds to S53, in which the CPU 14 determines whether the content title character strings 140a on the bookmark table 94a include a regional code identical to the registered regional code 223a on the setting information table 44a (S53). When determining that the content title character strings 140 on the bookmark table 94a do not include a regional code identical to the registered regional code 223a on the setting information table 44a (S53: No), the CPU 14 goes to S55. In S55, the CPU 14 registers an RSS feed URL 202a for a default country as the registered RSS feed URL 222a on the setting information table 44a. The default country may be arbitrarily selected and previously registered as an initial setting at the time of manufacture of the MFP 10. Thereafter, the CPU 14 goes to S63. Meanwhile, when determining that the content title character strings 140 on the bookmark table 94a include a regional code identical to the registered regional code 223a on the setting information table 44a (S53: Yes), the CPU 14 goes to S57.

In S57, the CPU 14 determines whether the content title character strings 140a on the bookmark table 94a include a country code identical to the registered country code 224a on the setting information table 44a (S57). When determining that the content title character strings 140a on the bookmark table 94a do not include a country code identical to the registered country code 224a on the setting information table 44a (S57: No), the CPU 14 goes to S59. In S59, the CPU 14 determines that the CPU 14 has specified a regional name of the using country based on the regional code but not yet a country name of the using country based on the country code. Then, the CPU 14 registers an RSS feed URL 202a for accessing a using-region RSS feed regarding the specified region, as the registered RSS feed URL 222a on the setting information table 44a. Thereafter, the CPU 14 goes to S63. Meanwhile, when determining that the content title character strings 140a on the bookmark table 94a include a country code identical to the registered country code 224a on the setting information table 44a (S57: Yes), the CPU 14 goes to S61.

In S61, the CPU 14 determines that the CPU 14 has exactly specified the using country based on both the regional name and the country name. Then, the CPU 14 registers an RSS feed URL 202a for accessing a using-country RSS feed regarding the using country, as the registered RSS feed URL 222a on the setting information table 44a (S61). Thereafter, the CPU 14 goes to S63.

In the second embodiment, it is assumed that the using country where the MFP 10 is used is the United States. Therefore, the RSS feed URL 202 "http://rss.brother.com," which corresponds to the data number 210a of "1" on the bookmark table 94a (see FIG. 11), is stored as the registered RSS feed URL 222a on the setting information table 44a (see FIG. 10).

In S63, the CPU 14 accesses a content providing server 91 based on the registered RSS feed URL 222a stored on the setting information table 44a, and acquires from the content providing server 91 an intended using-country RSS feed or an intended using-region RSS feed (S63).

In the second embodiment, the CPU 14 accesses a content providing server 91 based on the registered RSS feed URL 222a "http://rss.brother.com," and acquires the using-country RSS feed corresponding to the United States. Then, the CPU 14 creates contents regarding usage of the MFP 10 in the United States (e.g., update information and contact information about sales subsidiaries in the United States), and displays the created contents on the touch panel 50.

Thus, the MFP 10 of the second embodiment can provide the following effects. By storing only the bookmark URL 201a on the setting information table 44a, the MFP 10 can acquire an RSS feed URL 202a corresponding to a specified regional code 203a and a specified country code 204a. Thereby, even when the MFP 10 is required to select an RSS feed URL 202a corresponding to a using country from the RSS feed URLs 202a that are respectively prepared for a number of countries and access the selected URL 202a, the MFP 10 needs not store all kinds of RSS feed URLs 202a on the storage thereof. Thus, it is possible to reduce the storage capacity of the MFP 10.

Third Embodiment

In a third embodiment, the MFP 10, which is configured such that device specifications thereof can be changed, acquires an RSS feed URL corresponding to a specification change from the bookmark server 90. As an example of specification changes, cited is a change to upgrade a specification of the MFP 10 by adding a scanner unit or a sheet feeder unit.

In the third embodiment, the NVRAM 40 is provided with a setting information table 44b. The setting information table 44b stores setting items such as a registered specification code 223b, a bookmark URL 201b, and a registered RSS feed URL 222b. As the registered specification code 223b, stored is a specification code 203b that represents an updated specification of the MFP 10. At the time of shipment of the MFP 10, a specification code 203b corresponding to an initial configuration of the MFP 10 is registered as the registered specification code 223b.

Each of the content providing servers 91 stores device specification RSS feeds. Each of the device specification RSS feeds is created for a corresponding one of the device specifications, and includes various kinds of information such as update information.

The bookmark server 90 stores bookmark RSS feeds. The MFP 10 creates a bookmark table 94b based on the bookmark RSS feeds. On the bookmark table 94b, a content title character string 140b and an RSS feed URL 202b are registered for each of the device specifications. It is noted that the bookmark table 94b is configured in a similar manner to the bookmark table 94a in the second embodiment. Therefore, a detailed explanation about the bookmark table 94b will be omitted here.

Operations of the MFP 10 in the third embodiment will be described with reference to FIGS. 14 and 15. The following description will be provided under an assumption that the MFP 10 is upgraded with a scanner unit added thereto. A device specification setting process will be set forth referring to FIG. 14.

In S71, the CPU 14 determines whether an operation is provided for starting a device specification setting process (S71). The device specification setting process is launched, for example, in response to a user operation on the touch panel 50. When determining that an operation for starting a device specification setting process is not provided (S71: No), the CPU 14 goes back to S71 and continuously monitors whether an operation for starting a device specification setting process is provided. Meanwhile, when determining that an operation for starting a device specification setting process is provided (S71: Yes), the CPU 14 proceeds to S73.

In the device specification setting process of S73, the CPU 14 accepts a user's input to specify an updated specification. The CPU 14 registers a specification code 203b corresponding to the specified specification as the registered specification code 223b on the setting information table 44b.

It is noted that the CPU 14 may launch the device specification setting process automatically in response to detecting connection between a device (e.g., a scanner unit) and the MFP 10. Further, the CPU 14 may automatically detect a type of the device connected to the MFP 10, identify the updated specification and a corresponding specification code 203b, and register the identified specification code 203b as the registered specification code 223b on the setting information table 44b.

Next, referring to FIG. 15, an explanation will be provided about a specification RSS feed acquiring process. In S79, the bookmark URL 201b is registered on the setting information table 44b (S79). The bookmark URL 201b may be registered as an initial setting at the time of manufacture of the MFP 10.

A process of S81 to S93 is a loop process executed while the MFP 10 is working. In S81, the CPU 14 accesses the bookmark server 90 based on the bookmark URL 201b, and acquires the bookmark RSS feeds (S81). The CPU 14 runs the feed analyzing program 22 to create the bookmark table 94b from the bookmark RSS feeds acquired.

Then, the CPU 14 proceeds to S83, in which the CPU 14 determines whether the content title character strings 140b on the bookmark table 94b include a specification code identical to the registered specification code 223b on the setting information table 44b (S83). When determining that the content title character strings 140b on the bookmark table 94b do not include a specification code identical to the registered specification code 223b on the setting information table 44b (S83: No), the CPU 14 goes to S85. In S85, the CPU 14 registers an RSS feed URL 202b for a default specification as the registered RSS feed URL 222b on the setting information table 44b. Thereafter, the CPU 14 goes to S93. Meanwhile, when determining that the content title character strings 140b on the bookmark table 94b include a specification code identical to the registered specification code 223b on the setting information table 44b (S83: Yes), the CPU 14 goes to S91.

In S91, the CPU 14 determines that the CPU 14 has exactly identified the updated specification based on the specification code. Then, the CPU 14 registers an RSS feed URL 202b for accessing a specification RSS feed regarding the identified specification, as the registered RSS feed URL 222b on the setting information table 44b (S91). Thereafter, the CPU 14 goes to S93.

In the third embodiment, an RSS feed URL 202b, corresponding to the updated specification concerning the scanner unit added, is retrieved from the bookmark table 94b and stored as the registered RSS feed URL 222b on the setting information table 44b.

In S93, the CPU 14 accesses a content providing server 91 based on the registered RSS feed URL 222b stored on the setting information table 44b, and acquires an intended device specification RSS feed concerning the updated specification. Then, the CPU 14 creates contents (such as update information) regarding the updated specification, and displays the created contents on the touch panel 50.

Thus, the MFP 10 of the third embodiment needs not store on the storage thereof the RSS feed URL 202b for each of the device specifications. Hence, it is possible to reduce the storage capacity of the MFP 10.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned first embodiment, the association information (the error groups 203 and the error codes 204), which represents the association between each error and a corresponding error RSS feed, is contained in the content title character strings 140. However, the association information may not necessarily be contained in the content title character strings 140, and may be contained in any form within the bookmark RSS feeds.

Further, the setting information table 44 may have a plurality of registered error groups 223 and a plurality of registered error codes 224 stored thereon. Thereby, even when a plurality of errors occur simultaneously, it is possible to acquire an error information RSS feed for each of the plurality of errors.

Furthermore, although the bookmark server 90 is provided separately from the content providing servers 91 in the first embodiment, the bookmark server 90 may be included in the content providing servers 91.

What is claimed is:

1. A terminal device comprising:
   a memory comprising a first location storage unit configured to store first location information for accessing a plurality of first RSS feeds previously stored on at least one external server, the plurality of first RSS feeds associating a plurality of error codes with a plurality of pieces of second location information, each of the plurality of error codes corresponding to a specific one of a plurality of errors of the terminal device, and each of the plurality of pieces of second location information being for accessing a specific one of a plurality of second RSS feeds that corresponds to a specific one of the plurality of errors of the terminal device;

a controller configured to:
  access content summary information stored on at least one external server based on location information;
  repeatedly acquire the plurality of first RSS feeds stored on at least one external server based on the first location information stored on the first location storage unit;
  acquire a current error code of the terminal device and, if the plurality of first RSS feeds are acquired, retrieve a specific piece of the plurality of pieces of second location information associated with the current error code of the terminal device, based on the plurality of first RSS feeds that are acquired;
  acquire if the specific piece of the plurality of pieces of second location information associated with the current error code of the terminal device is retrieved, the specific one of the plurality of second RSS feeds stored on at least one external server, based on the retrieved specific piece of the plurality of pieces of second location information, the specific one of the plurality of second RSS feeds corresponding to the acquired current error code;
  not acquire the specific one of the plurality of second RSS feeds stored on at least one external server that corresponds to the acquired current error if the specific piece of the plurality of pieces of second location information associated with the acquired current error code of the terminal device is not retrieved;
  create, if the specific one of the plurality of second RSS feeds corresponding to the current error code of the terminal device is acquired, content information that shows how to manage an error corresponding to the acquired current error code, based on the specific one of the plurality of second RSS feeds that is acquired; and
  display on a display unit, if the content information that shows how to manage the error corresponding to the acquired current error code of the terminal device is created, the created content information.

2. The terminal device according to claim 1, the memory further comprising an error code storage unit and a second location storage unit, wherein the controller is further configured to:
  store the plurality of error codes on the error code storage unit;
  retrieve, based on the specific one of the plurality of errors of the terminal device, the second location information associated with the specific one of the plurality of errors stored on the error code storage unit;
  store the second location information retrieved based on the specific one of the plurality of errors of the terminal device on the second location storage unit; and
  access the specific one of the plurality of second RSS feeds based on the second location information stored on the second location storage unit.

3. The terminal device according to claim 1, further comprising:
  a printing unit configured to perform a printing operation, wherein the plurality of errors of the terminal device include at least one of an ink empty error representing a status out of ink, a paper jam, and a cover open error representing a status where a cover is left opened.

4. The terminal device according to claim 1, wherein:
the second location information is set for each of the plurality of errors of the terminal device; and
the controller is further configured to:
  acquire an a specific one of the plurality of error codes for identifying an error caused in the terminal device, and
  retrieve, based on the first location information, the second location information associated with the acquired identification.

5. The terminal device according to claim 1, wherein the specific one of the plurality of second RSS feeds comprises information for identifying a corresponding one of a plurality of device specifications of the terminal device.

6. The terminal device according to claim 5, wherein the plurality of device specifications include at least one of a using-country setting that represents a country where the terminal device is used and a device configuration setting that represents a device configuration of the terminal device.

7. The terminal device according to claim 5, wherein:
the second location information is set for each of the plurality of device specifications; and
the controller is further configured to:
  acquire an identification for identifying a device specification that corresponds to the terminal device, and
  retrieve, based on the first location information, the second location information associated with the acquired identification.

8. The terminal device according to claim 1, wherein:
each of the plurality of error codes is associated with a major divisional error code and a minor divisional error code; and
the controller is further configured to:
  attempt to retrieve the specific piece of the plurality of pieces of second location information based on the major divisional error code and the minor divisional error code associated with the specific piece of the plurality of pieces of second location information,
  access the specific one of the plurality of second RSS feeds based on the second location information associated with the major divisional error code when the attempt to retrieve the specific piece of the plurality of pieces of second location information associated with the major divisional error code succeeds, and
  access the specific one of the plurality of second RSS feeds based on the specific piece of the plurality of pieces of second location information associated with the minor divisional error code when the attempt to retrieve the specific piece of the plurality of pieces of second location information associated with the major divisional error code fails but the attempt to the attempt to retrieve the specific piece of the plurality of pieces of second location information associated with the minor divisional error code succeeds.

9. The terminal device according to claim 2, wherein:
each of the plurality of error codes is associated with a major divisional error code and a minor divisional error code; and
the controller is further configured to:
  attempt to retrieve the specific piece of the plurality of pieces of second location information based on the major divisional error code and the minor divisional error code associated with the specific piece of the plurality of pieces of second location information, store the specific piece of the plurality of pieces of second location information associated with the major divisional error code when the attempt to retrieve the specific piece of the plurality of pieces of second location information associated with the major divisional error code succeeds, and store the specific piece of the plurality of pieces of second location information associated with the minor divisional error code when the attempt to retrieve the specific piece of the plurality of pieces of second location information associated with the major divisional error code fails but the attempt to retrieve the specific piece of the plurality of pieces of second location information associated with the minor divisional error code succeeds.

10. A non-transitory computer readable medium having computer readable instructions stored thereon, which are executable by a processor of a terminal device to perform:

an accessing step of accessing content summary information stored on at least one external server based on location information;

a first location storing step of storing first location information for accessing a plurality of first RSS feeds previously stored on at least one external server, the plurality of first RSS feeds associating a plurality of error codes with a plurality of pieces of second location information, each of the plurality of error codes corresponding to a specific one of a plurality of errors of the terminal device, and each of the plurality of pieces of second location information being for accessing a specific one of a plurality of second RSS feeds that corresponds to a specific one of the plurality of errors of the terminal device;

a first acquiring step of repeatedly acquiring the plurality of first RSS feeds stored on at least one external server based on the first location information stored in the first location storing step;

a second acquiring step of acquiring a current error code of the terminal device;

a retrieving step of retrieving, if the first acquiring step acquires the plurality of first RSS feeds stored on at least one external server, a specific piece of the plurality of pieces of second location information associated with the current error code of the terminal device acquired by the second acquiring step, based on the plurality of first RSS feeds acquired in the first acquiring step;

a third acquiring step of acquiring, if the retrieving step retrieves the specific piece of the plurality of pieces of second location information, the specific one of the plurality of second RSS feeds stored on at least one external server based on the specific piece of the plurality of pieces of second location information retrieved in the retrieving step, the specific one of the plurality of second RSS feeds corresponding to the acquired current error code;

a not acquiring step of not acquiring, via the access interface, the specific one of the plurality of second RSS feeds stored on at least one external server that corresponds to the acquired current error if the retrieving step does not retrieve the specific piece of the plurality of pieces of second location information associated with the acquired current error code of the terminal device;

a creating step of creating, if the third acquiring step acquires the specific one of the plurality of second RSS feeds, content information that shows how to manage an error corresponding to the acquired current error code, based on the specific one of the plurality of second RSS feeds acquired in the third acquiring step; and a displaying step of displaying on a display unit, if the creating step creates the content information that shows how to manage the error corresponding to the acquired current error code of the terminal device, the created content information.

11. The non-transitory computer readable medium according to claim 10, wherein the instructions cause the processor to further perform:

an error code storing step of storing the plurality of error codes on an error code storage unit, wherein the retrieving step comprises:

a step of retrieving, based on the specific one of the plurality of errors of the terminal device, the second location information associated with the specific one of the plurality of errors of the terminal device stored in the error code storing step, and a second location storing step of storing the second location information retrieved in the retrieving step, and wherein the third acquiring step comprises a step of accessing the specific one of the plurality of second RSS feeds based on the second location information stored in the second location storing step.

12. The non-transitory computer readable medium according to claim 10, wherein the processor is configured to perform a printing operation, and wherein the plurality of errors of the terminal device include at least one of an ink empty error representing a status out of ink, a paper jam, and a cover open error representing a status where a cover is left opened.

13. The non-transitory computer readable medium according to claim 10, wherein:

the second location information is set for each of the plurality of errors of the terminal device, the instructions cause the processor to further perform an identification acquiring step of acquiring, in response to an error caused in the terminal device, a specific one of the plurality of error codes for identifying the error causes in the terminal device, and wherein the retrieving step comprises a step of retrieving, based on the first location information, the second location information associated with the acquired identification.

14. The non-transitory computer readable medium according to claim 10, wherein the specific one of the plurality of second RSS feeds comprises information for identifying a corresponding one of a plurality of device specifications of the processor.

15. The non-transitory computer readable medium according to claim 14, wherein the plurality of device specifications include at least one of a using-country setting that represents a country where the processor is used and a device configuration setting that represents a device configuration of the processor.

16. The non-transitory computer readable medium according to claim 14, wherein:

the second location information is set for each of the plurality of device specifications, the instructions cause the processor to further perform an identification acquiring step of acquiring an identification a device specification that corresponds to the terminal device, and the retrieving step comprises a step of retrieving, based on the first location information, the second location information associated with the acquired identification.

17. The non-transitory computer readable medium according to claim 10, wherein:

each of the plurality of error codes is associated with a major divisional error code and a minor divisional error code; and the retrieving step comprises a step of attempting to retrieve the specific piece of the plurality of pieces of second location information based on the major divisional error code and the minor divisional error code associated with the specific piece of the plurality of pieces of second location information, the second accessing step comprises a step of accessing the specific one of the plurality second RSS feeds based on the second location information associated with the major divisional error code when the attempt to retrieve the specific piece of the plurality of pieces of second location information associated with the major divisional error code succeeds, and the second accessing step further comprises a step of accessing the specific one of the plurality second RSS Feeds based on the second location information associated with the minor divisional error code when the attempt to retrieve the specific piece of the plurality of pieces of second location information associated with the major divisional error code fails but the attempt to retrieve the specific piece of the plurality of pieces of second location information associated with the minor divisional error code succeeds.

18. The non-transitory computer readable medium according to claim 11, wherein:

each of the plurality of error codes is associated with a major divisional error code and a minor divisional error code; and the retrieving step comprises a step of attempting to retrieve the specific piece of the plurality of pieces of second location information based on the major divisional error code and the minor divisional error code associated with the specific piece of the plurality of pieces of second location information, the instructions cause the processor to further perform a second location storing step of storing the specific piece of the plurality of pieces of second location information associated with the major divisional error code when the attempt to retrieve the specific piece of the plurality of pieces of second location information associated with the major divisional error code succeeds, and the second location storing step further comprises a step of storing the specific piece of the plurality of pieces of second location information associated with the minor divisional error code when the attempt to retrieve the specific piece of the plurality of pieces of second location information associated with the major divisional error code fails but the attempt to retrieve the specific piece of the plurality of pieces of second location information associated with the minor divisional error code succeeds.

* * * * *